Aug. 28, 1962
H. MAHN
3,051,048
MECHANISM FOR RELATIVELY DISPLACING THE
COMPONENTS OF OPTICAL OBJECTIVES
Filed March 24, 1960
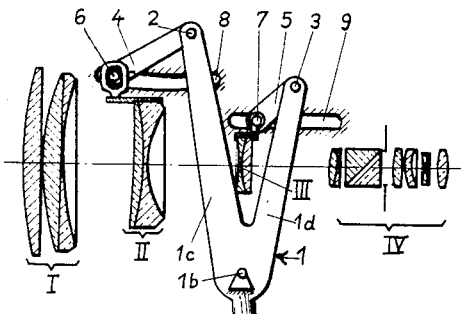
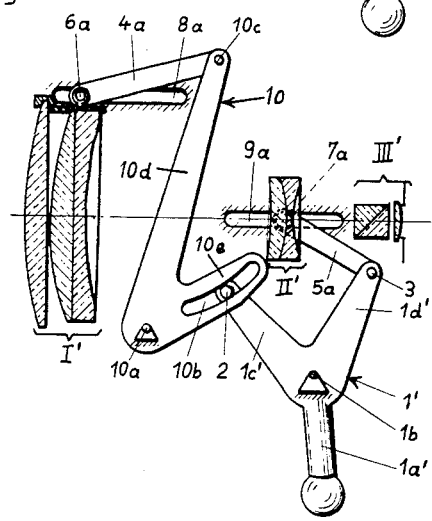
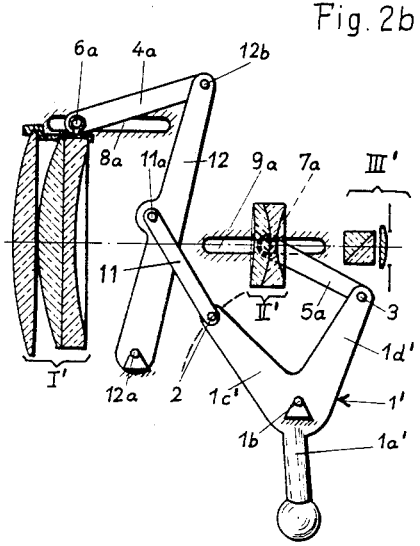
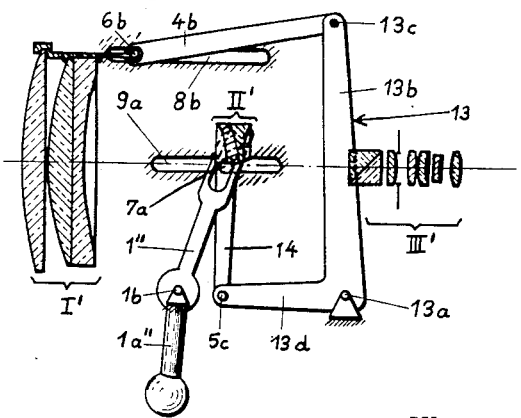
INVENTOR:
Herbert Mahn
BY
Karl F. Ross
Agent

United States Patent Office 3,051,048
Patented Aug. 28, 1962

3,051,048
MECHANISM FOR RELATIVELY DISPLACING
THE COMPONENTS OF OPTICAL OBJECTIVES
Herbert Mahn, Bad Kreuznach, Germany, assignor to
Jos. Schneider & Co., Optische Werke, Kreuznach,
Rhineland, Germany, a corporation of Germany
Filed Mar. 24, 1960, Ser. No. 17,338
Claims priority, application Germany Apr. 22, 1959
5 Claims. (Cl. 88—57)

My present invention relates to optical objectives for photographic, cinematographic and television cameras, or for enlarging and reproducing devices, in which one or more lens members are axially displaceable, according to a predetermined law, with respect to the remaining component or components. This includes the so-called varifocal objectives in which the relative adjustability of the components is utilized to change the overall focal length between predetermined limits while maintaining the position of the image plane substantially fixed.

The use of cams for the translation of the adjustment of a control element into a displacement of a movable component imposes definite limitations upon the transmission ratio between the controlling and the controlled motion. Other conventional transmission means, such as gears or racks, are not readily adaptable to non-linear displacement ratios following an intricate law. Combinations of cams and gears may afford the necessary versatility but are often objectionably bulky and tend to magnify the lost motion of the system while introducing cumulative errors.

It is, therefore, an object of my present invention to provide a highly compact and versatile mechanism for the displacement of one or more objective components according to a predetermined law.

A more specific object of this invention is to provide a mechanism of this character which is utilizable even under circumstances requiring a reversal of the relative sense of displacement of two movable components.

In accordance with this invention I provide, in an optical objective with one or more movable components, an articulated linkage between a control element and each movable component, this linkage including a crank swingably coupled with the control element and a pitman connected either directly or indirectly with the crank; the free end of the pitman is constrained to move along a generally linear path, preferably by means of a stationary guiding surface such as the wall of a slot, and is connected with the controlled component. Where several cranks are provided for the control of a corresponding plurality of components, these cranks may form a rigid unit with one another and with the control element.

In many instances, particularly where it is desired to reverse the direction of motion of the controlled component at some intermediate point of the range of displacement of the control element, the pitman may be driven from the crank via a connecting member which is swingably coupled with the crank for reciprocating movement about a dead-center position. In such case it is also possible to couple the connecting member directly with a second, non-reversing component.

The invention will be described in greater detail with reference to the accompanying drawing in which:

FIG. 1 illustrates, somewhat schematically, a mechanism for concurrently displacing two components of a four-component objective in the same direction;

FIG. 2a shows another control mechanism embodying the invention, enabling the reversal of motion of one of two movable components in a three-component objective;

FIG. 2b represents a modification of the system of FIG. 2a; and

FIG. 3 illustrates a further embodiment for the control of the two movable components of the system of FIGS. 2a and 2b with reversal of their relative motion.

In FIG. 1 I have shown a conventional varifocal objective system comprising a stationary front component I, two movable intermediate components II, III and a stationary rear component IV. The control element is in the form of a bifurcated lever 1, swingable about a fixed pivot 1b, which has an integral handle 1a and two prongs 1c, 1d. These prongs constitute a pair of cranks respectively connected, via pins 2 and 3, to two pitmans 4 and 5. The pitmans are coupled with the movable components II and III, respectively, by means of studs 6 and 7 which are guided in a pair of elongated slots 8 and 9 formed, for example, in the wall of the objective housing. It will be noted that slot 8 is slightly curved as a further measure for determing the law of displacement of component II. It will be seen that, by this means, intricate relative motions may be carried out by the two movable components II and III under the control of handle 1a.

The subsequent figures illustrate the application of my invention to an objective system, having a fixed rear component III', wherein a movable front component I' reverses its motion while a movable intermediate component II' moves unidirectionally upon a progressive displacement of a control member over its operative range.

In FIG. 2a the control element 1', swingable about its fixed fulcrum 1b, is generally similar to element 1 of FIG. 1 and comprises a handle 1a' as well as two prongs 1c', 1d'. Pin 2, mounted on the free end of prong 1c', couples this prong with a bell-crank lever 10 which is swingable about a fixed fulcrum 10a; lever 10 has a long arm 10d, articulated via a pin 10c to a pitman 4a, and a short arm 10e provided with an arcuate slot 10b which accommodates the pin 2. The pitman 4a has its free end guided in an elongated slot 8a by a stud 6a which is also connected with the movable front component I'. The second prong 1d' is linked through its hinge pin 3 with a pitman 5a whose free end carries a stud 7a, the latter playing in a slot 9a while being connected with the movable intermediate component II'. It will be apparent in an intermediate position of handle 1a', in which the radious 2–1b is normal to the curvature of slot 10b, that the lever 10 is at dead center while the front component I' is at the left-hand end of its travel; when the control element 1' is swung to either side of this dead-center position, lever 10 rotates clockwise and displaces the component I' toward the right. While component I' thus reverses its motion upon a progressive displacement (e.g. counterclockwise) of handle 1a' from the beginning to the end of its range, component II' is moved unidirectionally (e.g. from right to left) by the pitman 5a.

In FIG. 2b I have replaced the bell-crank lever 10 by a linkage consisting of two levers 11, 12 articulated by a pin 11a, the shorter lever 11 being engaged by the pin 2 of prong 1c' whereas the longer lever 12 is swingable about a fixed fulcrum 12a and is coupled with the pitman 4a by a pin 12b. In this system the dead-center position occurs when the radius 2–11a is perpendicular to the circuar orbit of pin 2 about the fixed fulcrum 1b, i.e. when the pivotal points 1b, 2 and 11a lie on a straight line. The reciprocating motion of component I' and the unidirectional motion of component II' are similar to those described in connection with FIG. 2a.

In FIG. 3 the control member 1" has a single arm rigid with a handle 1a"; the free end of this arm forms a bifurcation straddling the stud 7a which, as in the preceding embodiments, travels in a slot 9a and engages the movable component II'. Stud 7a is carried on an extremity of a lever 14 whose other extremity is articulated, via a pin 5c, to the short arm 13b of a bell-crank lever 13 having a fixed pivot 13a. The long arm 13b of lever 13 is coupled via a pin 13c with a pitman 4b whose free end carries a stud 66, this stud playing in a slot 8b while being connected with the movable front component I'. It will be apparent that the system of FIG. 3 has a dead-center position in which the lever 14, or, more exactly, the radius 7a–5c, stands at right angles to the slot 9a, this being the position illustrated in the figure. Since a turning of handle 1a'' in either direction from this illustrated position causes a clockwise swing of the lever 13, the front component I' reverses its motion while the intermediate component II' progresses unidirectionally. This system, accordingly, also operates in substantially the manner described in connection with FIGS. 2a and 2b, the lever 14 taking the place of the second pitman 5a.

It will be understood that the movable components illustrated in the drawing are to be guided in suitable lens mounts (not shown) which are known per se and serve to maintain these components in their position of axial alignment with the fixed lens members of the objective system. Naturally, the arrangements particularly described and illustrated may be modified in various ways, e.g. by the curving of one or both slots in the manner shown for the slot 8 in FIG. 1, without departing from the spirit and scope of my invention except as otherwise limited in the appended claims.

I claim:
1. In an optical objective system, in combination a plurality of movable components, a lever having a fixed fulcrum, a pitman articulatedly linking one of said components with a point of said lever relatively remote from said fulcrum, a control element swingable about a fixed pivot spaced from said fulcrum, first link means joining said element with a portion of said lever relatively close to said fulcrum, first guide means constraining said one component to a motion along a generally rectlinear path, said first link means having a dead-center position whereby a unidirectional swing of said element is converted into a reciprocating motion of said one component along said path, second link means connecting another of said components with said element for unidirectional displacement by a unidirectional swing of the latter, and second guide means constraining said other component to generally rectilinear motion in line with said path, said control element being provided with a pair of rigidly interconnected arms having free extremities respectively secured to said first and second link means.

2. The combination according to claim 1 wherein said second link means comprises another pitman.

3. The combination according to claim 2 wherein said first link means comprises a stud, said lever having an arcuate slot receiving said stud.

4. The combination according to claim 2 wherein said first link means comprises a rod articulated to said lever and to one of said extremities.

5. In an optical objective system, in combination, a plurality of movable components, a lever having a fixed fulcrum, a pitman articulatedly linking one of said components with a point of said lever relatively remote from said fulcrum, a control element swingable about a fixed pivot spaced from said fulcrum, first link means joining said element with a portion of said lever relatively close to said fulcrum, first guide means constraining said one component to a motion along a generally rectlinear path, said first link means having a dead-center position whereby a unidirectional swing of said element is converted into a reciprocating motion of said one component along said path, second link means connecting another of said components with said element for unidirectional displacement by a unidirectional swing of the latter, and second guide means constraining said other component to generally rectilinear motion in line with said path, said first link means comprising another pitman, said second link means comprising a stud on said other pitman, said element being provided with a bifurcation straddling said stud.

References Cited in the file of this patent
UNITED STATES PATENTS
2,454,686    Back _____ Nov. 23, 1948
FOREIGN PATENTS
810,152    Great Britain _____ Mar. 11, 1959